United States Patent [19]

Mügge et al.

[11] Patent Number: 5,389,410
[45] Date of Patent: Feb. 14, 1995

[54] THERMOPLASTIC MULTILAYER COMPOSITES OF POLYAMIDE AND LINEAR CRYSTALLINE POLYESTER BLENDS

[75] Inventors: Joachim Mügge, Haltern; Stefan Röber; Hans Jadamus, both of Marl, all of Germany

[73] Assignee: Huels Aktiengesellschaft - PB 15, Marl, Germany

[21] Appl. No.: 974,286

[22] Filed: Nov. 10, 1992

[30] Foreign Application Priority Data

Nov. 14, 1991 [DE] Germany ................... 4137434

[51] Int. Cl.$^6$ .............................................. B32B 27/08
[52] U.S. Cl. ................... 428/34.1; 428/430; 428/483; 428/475.8
[58] Field of Search ............ 428/480, 483, 475.8, 428/34.1

[56] References Cited

U.S. PATENT DOCUMENTS

| | | | |
|---|---|---|---|
| 3,378,602 | 4/1963 | Robertson | 260/857 |
| 4,215,176 | 7/1980 | Tuller et al. | 428/412 |
| 4,370,379 | 1/1983 | Kato et al. | 428/480 X |
| 4,443,519 | 4/1984 | Donermeyer et al. | 428/336 |
| 4,528,219 | 7/1985 | Yamada et al. | 428/35 |
| 4,656,242 | 4/1987 | Swan et al. | 528/295.3 |
| 4,725,488 | 2/1988 | Swan et al. | 428/248 |
| 4,855,181 | 8/1989 | Shimo et al. | 428/336 |
| 4,980,210 | 12/1990 | Keyes | 428/475.8 |
| 5,108,844 | 4/1992 | Blemberg et al. | 428/518 |

FOREIGN PATENT DOCUMENTS 0008891 3/1980 European Pat. Off. .
0365211 4/1990 European Pat. Off. .

*Primary Examiner*—Paul J. Thibodeau
*Assistant Examiner*—David Abraham
*Attorney, Agent, or Firm*—Oblon, Spivak, McClelland, Maier, & Neustadt

[57] ABSTRACT

A multilayer composite having improved chemical resistance and improved intimate holding between layers is provided comprising (A) a layer of a polyamide-based molding composition having a specified level of amino end groups, and (B) a molding composition comprising a blend of a linear crystalline polyester and a polymer having a specified level of reactive end groups other than epoxide groups.

18 Claims, No Drawings

THERMOPLASTIC MULTILAYER COMPOSITES OF POLYAMIDE AND LINEAR CRYSTALLINE POLYESTER BLENDS

BACKGROUND OF THE INVENTION

1. Field of the Invention

The present invention relates to a thermoplastic multilayer composite having improved barrier action against diffusion of chemicals, and improved adhesion between the layers of the composite.

2. Discussion of the Background

While polyamides and polyesters are individually useful for a variety of end products, they are unsuitable for a number of specific uses. For example, polyamides show poor resistance to weathering, since they age under exposure to light and absorb atmospheric moisture, leading to discoloration, deterioration in mechanical properties and warping phenomena.

Although polyamides have good mechanical properties, in particular a good toughness, they provide poor barrier properties. In particular polar substances migrate easily through polyamides. This is especially a problem in fuel lines which transport alcohol-containing fuel.

Polyesters, on the other hand, exhibit good resistance to weathering and excellent barrier properties against both polar and non-polar media. However, they generally show unacceptable impact properties such as notched impact strength. Thus, polyesters cannot be used in cases where combinations of properties such as excellent barrier action, high temperature resistance and good rigidity, are desired.

German Patent 38 27 092 describes a multilayer pipe which has, from the inside outward, layers of polyamide, polyvinyl alcohol, polyamide and polyester. The polyester is used only as a thin outer layer, in order to achieve a higher resistance to short-term heat deformation. However, it is well known in the field of polymer composites that the majority of polymers, such as polyamides and polyesters, are incompatible with one another. Thus, the typical result of most multilayer composites is that the laminate layers show no adhesion to one another. An intimate bond between the individual polymer layers is absolutely essential for industrial uses, in order to avoid delamination.

Multilayer composites of particular polyamide mixtures and various other thermoplastics, such as polyethylene terephthalate, are known from EP-A-287 839. Conventionally, in order to achieve necessary adhesion, an adhesion promoter is introduced between the laminate layers. Examples of such adhesion promoters include functionalized polyolefins, functionalized ethylene/vinyl acetate copolymers, ethylene/acrylate copolymers, ionomers, polyalkylene oxide/polyester block copolymers, derivatives of carboxymethyl cellulose and blends of these polymers with polyolefins.

It has now been found that these adhesion promoters do not give a long-term intimate bond, especially in a polyamide/polyester system. Because the adhesion promoters are not sufficiently resistant to thermal deformation and solvents, the adhesion which is achieved is usually lost under conditions of heating or under the action of solvents. Additionally, these composites fail when exposed to shear forces due to cold flow of the adhesion promoter.

SUMMARY OF THE INVENTION

Accordingly, one object of the present invention is to provide a solvent- and heat-resistant bond between a polyester and a polyamide which is insensitive to shear stresses and has good mechanical properties.

A further object of the present invention is to provide a bond between a polyester and a polyamide which exhibits strong cohesion at the phase boundaries.

These and other objects and attendant advantages have been satisfied by the discovery of thermoplastic multilayer composites comprising (A) at least one layer of a polyamide-based molding composition having at least 50% of the polyamide end groups as amino groups and the total concentration of amino end groups in component (A) being from 30 to 130 mmol/kg, and (B) at least one layer of a molding composition comprising 95 to 60% by weight of a linear, crystalline polyester, and 5 to 40% of a polymer having reactive end groups other than epoxy groups, wherein the reactive end groups are present in component (B) at a range of from 4 to 95 mmol/kg, so that the two or more layers are intimately bonded to one another.

DETAILED DESCRIPTION OF THE PREFERRED EMBODIMENTS

The present invention relates to a thermoplastic multilayer composite comprising:

(A) at least one layer of a polyamide-based molding composition, wherein at least 50% of all the end groups present in the polyamide are amino end groups and the concentration of amino end groups in component (A) are in the range of from 30 to 130 mmol/kg; and (B) at least one layer of a molding composition comprising a) 95 to 60% by weight of a linear, crystalline polyester, and b) 5 to 40% by weight of a polymer containing reactive groups other than epoxide groups, wherein the reactive groups are present in component (B) at a concentration of from 4 to 95 mmol/kg, such that the two or more layers are intimately bonded to one another.

The inner and outer layers of component (A) may be made from the same or different polyamides. Each layer may comprise a single polyamide or a mixture of suitable polyamides. Suitable polyamides for use as the layers in component (A) include aliphatic homo- and copolycondensates. Examples of homopolyamides include 4,6-; 6,6-; 6,12-; 8,10- and 10,10 polyamides. In particular, 6-; 10,12-; 11-; 12- and 12,12-polyamides are preferred. The identification of the polyamides corresponds to the international standard, the first figure(s) indicating the number of C atoms of the starting diamine and the last figure(s) indicating the number of C atoms of the dicarboxylic acid. If only one number is given, this means that an α,ω-amino-carboxylic acid or the lactam derived therefrom has been used as the starting substance (see H. Domininghaus, *"Die Kunststoffe und ihre Eigenschaften"* Plastics and their Properties, page 272, VDI-Verlag (1976).

If copolyamides are used, these comprise one or more additional acid components, such as adipic acid, sebacic acid, suberic acid, isophthalic acid or terephthalic acid, and one or more additional diamines, such as bis (4'-aminocyclohexyl)-methane, trimethylhexamethylenediamine, or hexamethylenediamine.

The preparation of these polyamides is known (for example D. B. Jacobs, J. Zimmermann, *Polymerization*

*Processes*, page 424–67; Interscience Publishers, New York (1977) and DE-AS 21 52 194).

Mixed aliphatic/aromatic polycondensates such as are described, for example, in U.S. Pat. Nos. 2,071,250; 2,071,251; 2,130,523; 2,130,948; 2,241,322; 2,312,966; and 3,393,210 and in Kirk-Othmer, *Encyclopedia of Chemical Technology*, 3rd Edition, Volume 18, page 328 and 435—Wiley & Sons (1982) are also suitable as the polyamides. Additionally, poly(ether-ester-amides) and poly(ether-amides) are polycondensates which are suitable as the polyamides. Such products are described, for example, in DE-OS 27 12 987, 25 23 991 and 30 06 961.

The molecular weight (number-average) of the polyamides is above 5,000, preferably from 10,000 to 100,000, corresponding to a relative viscosity ($\eta$rel) in the range from 1.5 to 2.8.

One essential feature of the polyamides of component (A) is that at least 50%, preferably 70%, of all the end groups present in the polyamide are amino end groups. Moreover, it is important that the concentration of amino end groups in component (A) is in the range of from 30 to 130 mmol/kg, preferably 60 to 110 mmol/kg.

The linear, crystalline polyester of component (B) has the following formula (I)

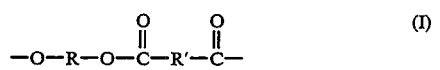

where R represents a divalent, branched or non-branched, aliphatic and/or cycloaliphatic, radical derived from a diol having 2 to 12, preferably 2 to 8, C atoms in the carbon chain and R' represents a divalent aromatic radical having 6 to 20, preferably 8 to 12, C atoms in the carbon skeleton.

Suitable diols include ethylene glycol, trimethylene glycol, tetramethylene glycol, hexamethylene glycol, neopentyl glycol, and cyclohexanedimethanol, with ethylene glycol and tetramethylene glycol being preferred.

Up to 25 mol % of the diol portion of the polyester can be replaced by a second diol selected from the same group of diols as the first, or by a diol having the following formula (II)

wherein R" denotes a divalent radical having 2 to 4 C atoms and x is an integer from 2 to 50.

Suitable aromatic carboxylic acids include terephthalic acid, isophthalic acid, 1,4-, 1,5-, 2,6- or 2,7-naphthalenedicarboxylic acid, diphenic acid and diphenyl ether-4,4'-dicarboxylic acid.

Up to 20 mol % of these aromatic dicarboxylic acids can be replaced by one or more aliphatic dicarboxylic acids, such as, succinic acid, maleic acid, fumaric acid, sebacic acid, and dodecanedioic acid.

Any conventional method may be used to prepare the linear, crystalline polyester of the present invention (see the following for preparative methods: DE-A 24 07 155 and 24 07 156; and *Ullmanns Encyclopadie der technischen Chemie* (Ullmann's Encyclopedia of Industrial Chemistry), 4th Edition, Volume 19, page 65 et seq.—Verlag Chemie GmbH, Weinheim, 1980).

The polyesters employed according to the invention have a viscosity number (J value) in the range from 80 to 240 cm³/g, preferably 130 to 210 cm³/g.

The polyamide of component (A) or the linear, crystalline polyester of component (Ba) or both can comprise up to 40% by weight of other thermoplastics as long as these additional thermoplastics do not interfere with the bonding capacity. Examples of such thermoplastics include polycarbonate [H. Schnell, *Chemistry and Physics of Polycarbonates*, Interscience Publishers, New York (1981)], acrylonitrile/styrene/butadiene copolymer (Houben-Weyl, *Methoden der organischen Chemie* (Methods of Organic Chemistry), Volume 14/1, Georg Thieme Verlag Stuttgart, pages 393–406; *Ullmanns Encyclopadie der technischen Chemie* (Ullmann's Encyclopedia of Industrial Chemistry), 4th Edition, Volume 19, Verlag Chemie Weinheim (1981), pages 279–284), acrylonitrile/styrene/acrylate copolymer (*Ullmanns Encyclopadie der technischen Chemie* (Ullmann's Encyclopedia of Industrial Chemistry), 4th Edition, Volume 19, Verlag Chemie Weinheim (1981), pages 277–295), acrylonitrile/styrene copolymer (*Ullmanns Encyclopadie der technischen Chemie* (Ullmann's Encyclopedia of Industrial Chemistry), 4th Edition, Volume 19, Verlag Chemie Weinheim (1981), page 273 et seq.) or polyphenylene ethers (DE-A 32 24 691 and 32 24 692 and U.S. Pat. Nos. 3,306,874, 3,306,875 and 4,028,341).

If necessary, the polyamides and/or polyesters can be impact modified. Polymers suitable as impact modifiers include ethylene/propylene or ethylene/propylene/diene copolymers (EP-A-295 076), polypentenylene, polyoctenylene, or random copolymers or copolymers having a block-like structure of alkenyl-aromatic compounds with aliphatic olefines or dienes (EP-A-261 748). Additionally, impact-modifying rubbers may be used, such as core/shell rubbers. These have a tough and resilient core of acrylate, methacrylate, butadiene or styrene/butadiene rubber with glass transition temperatures $T_g < -10°$ C., with the core optionally being crosslinked. The shell can be built up from styrene or methyl methacrylate or other unsaturated monomers or combinations thereof (DE-A 21 44 528 and 37 28 685).

Polymers which contain reactive groups which are capable of reacting with the reactive groups of a polyester or of a polyamide are used as component (Bb). In the context of the present invention reactive groups include carboxyl, anhydride, ester, N-acyl-lactam and oxazoline groups. Carboxylic acid anhydride groups are particularly suitable. Preferably the polymer of component (Bb) is a rubber elastic polymer.

Examples of polymers which are suitable for component (Bb) include: styrene/maleic acid, styrene/(meth-)acrylic acid, styrene/butyl acrylate/(meth)acrylic acid, ethylene/(meth)acrylic acid and ethylene/butyl acrylate/(meth)acrylic acid copolymers.

Additionally one may use graft copolymers having ethylene/propylene, ethylene/propylene/diene, styrene/butadiene block, styrene/butadiene, styrene block, styrene/ethylene/butylene block or styrene/acrylate copolymers, butadiene, acrylate or silicone rubbers, or polytransoctenylene as the graft base.

Monomers which are suitable as the shell of the graft copolymer contain one or more of the above identified reactive groups. Examples of these include, (meth)acrylic acid, maleic acid (anhydride), vinyloxazoline and methacryloyllauro lactam.

The polymers containing reactive groups are known and can be prepared by conventional methods [EP-A 164 179, 173 380, 210 307 and 404 261; U.S. Pat. No. 3,953,655; F. R. Eirick, *Science and Technology of Rub-* ber, Academic Press, New York (1978), pages 43–48, 65–71, 455–487; M. Fedtke, *Reaktionen an Polymeren* (Reactions on Polymers), VEB Deutscher Verlag für Grundstoffindustrie, Leipzig, (1985); G. Allen, Comprehensive Polymer Science, Pergamon Press, Oxford, (1988), pages 2–42, 403–419; and P. Svec, Styrene-based Plastics and their Modification, Ellis Horwood, New York, (1989)].

Component (B) comprises 95 to 60%, preferably 95 to 70%, more preferably 90 to 80% by weight of component (Ba) and 5 to 40%, preferably 5 to 30%, more preferably 10 to 20% by weight of component (Bb). The reactive groups of component (Bb) must be present in component (B) in a concentration of from 4 to 95 mmol/kg, preferably from 6 to 75 mmol/kg.

Component (B) can be prepared by conventional methods such as mixing components (Ba) and (Bb) in the melt at temperatures of between 200° and 300° C., in a mixing unit having good kneading action, such as a twin-screw kneader.

Customary auxiliaries and additives, such as flame-proofing agents, stabilizers, processing auxiliaries, viscosity modifiers, fillers, and pigments, can be added to component (A) or component (B) or both. The amount of auxiliaries and additives, in particular of processing auxiliaries, must be chosen so that the barrier properties are not detrimentally affected.

The multilayer composites of the present invention can be produced in one or more stages.

In a one-stage multicomponent injection molding process, the various melts are brought together by conventional co-extrusion in a mold and the molding is allowed to cool.

In a multi-stage process, a molding is first produced either from component (A) or from component (B) and is then charged with the other components. The charging of the mold in this type process can be done by any conventional means, such as compression molding, injection molding or extrusion.

The multilayer composites according to the present invention have excellent chemical resistance and excellent barrier action against diffusion with respect to chemical agents, such as solvents and fuels. Additionally, the two or more layers are intimately bonded to one another, so that during thermal expansion or bending of the composite, no delamination of the various layers occurs. It is further possible to produce materials of the present invention which comprise several of the multilayer composites of the present invention combined in a doubly laminated structure.

The multilayer composites of the present invention are useful in construction components, especially in the electrical, mechanical engineering and car industries, where the rigidity of the polyester is combined with the toughness of the polyamide, or where the adverse properties of the polyamide, such as lack of UV resistance, inadequate scratch resistance or poor barrier action, are counterbalanced by a coating of polyester. In particular, they can be used as films, preferably as food packaging films, or as multilayer pipes, such as those in the motor vehicle industry.

Having generally described this invention, a further understanding can be obtained by reference to certain specific examples which are provided herein for purposes of illustration only and are not intended to be limiting unless otherwise specified.

The results shown in the examples were determined with the aid of the following measurement methods.

The determination of the solution viscosity (relative viscosity $\eta_{rel}$) of the polyamides is carried out using a solution of 0.5% by weight of the polyamide in m-cresol at 25° C. in accordance with DIN 53 727/ISO 307.

The determination of the solution viscosity (viscosity number J) of the polyesters is carried out using a solution of 0.5% by weight of the polyester in an o-dichlorobenzene/phenol mixture (50:50 parts by weight) at 25° C. in accordance with DIN 53 728/ISO 1628—Part 5.

To determine the amino end groups, 1 g of component (A) is dissolved in 50 ml of m-cresol at 25° C. The solution is titrated potentiometrically with perchloric acid.

To determine the carboxyl end groups in component (A) or (B), 1 g of polycondensate is dissolved in 50 ml of benzyl alcohol at 165° C., while blanketing with nitrogen. The dissolving time is no more than 20 minutes. The solution is titrated with a solution of KOH in ethylene glycol (0.05 mol of KOH/1) against phenolphthalein until the color changes.

The determination of the reactive groups in component (Bb) is dependent upon the nature of the reactive group. In the case of maleic anhydride, the content is determined by IR spectroscopy (anhydride bands at 1790 cm$^{-1}$).

The test for ease of separation at the boundary by mechanical means is carried out by applying a metal wedge (edge angle: 5 degrees; weight applied: 2.5 kg), to attempt to separate the material boundary layer under investigation. If separation occurs at the boundary between the components, the adhesion is poor. If separation occurs entirely or partly within one of the components, good adhesion exists.

Experiments A–K are comparative experiments which are outside the scope of the present invention.

EXAMPLES

A. Component (A)

A 1: Polyamide 12 ($\eta_{rel}$: 1–6; 34% of the end groups are amino groups; 39 mmol/kg of amino end groups; 75 mmol/kg of carboxyl end groups)

A 2: Polyamide 12 ($\eta_{rel}$: 1.9; 86% of the end groups are amino groups; 60 mmol/kg of amino end groups; 10 mmol/kg of carboxyl end groups)

A 3: Polyamide 12 ($\eta_{rel}$: 2.08; 30% of the end groups are amino groups; 16 mmol/kg of amino end groups; 36 mmol/kg of carboxyl end groups)

A 4: Polyamide 6,6 ($\eta_{rel}$: 1-9; 30% of the end groups are amino groups; 27 mmol/kg of amino end groups; 63 mmol/kg of carboxyl end groups)

A 5: Polyamide 12 ($\eta_{rel}$: 2.1; 8.3% of the end groups are amino groups; 5 mmol/kg of amino end groups; 55 mmol/kg of carboxyl end groups)

A 6: Polyamide 12 ($\eta_{rel}$: 2.1; 28% of the end groups are amino groups; 17 mmol/kg of amino end groups; 43 mmol/kg of carboxyl end groups; modified with 7.5 parts by weight of commercially available plasticizer per 100 parts by weight of polyamide 12)

A 7: Polyamide 6 ($\eta_{rel}$: 2.01; 51.6% of the end groups are amino groups; 33 mmol/kg of amino end groups; 31 mmol/kg of carboxyl end groups)

A 8: Polyamide 6,12 ($\eta_{rel}$: 1.8; 4% of the end groups are amino groups; 5 mmol/kg of amino end groups; 120 mmol/kg of carboxyl end groups)

A 9: Polyamide 6,12 ($\eta_{rel}$: 1.8; 88% of the end groups are amino groups; 93 mmol/kg of amino end groups; 13 mmol/kg of carboxyl end groups)

A 10: Polyamide 10,12 ($\eta_{rel}$: 1.89; 86% of the end groups are amino groups; 101 mmol/kg of amino end groups; 16 mmol/kg of carboxyl end groups)

A 11: Polyamide 6,6 ($\eta_{rel}$: 1.81; 78% of the end groups are amino groups; 105 mmol/kg of amino end groups; 29 mmol/kg of carboxyl end groups)

B. Component (B)

B 1: Homo-polybutylene terephthalate (J value: 165 cm$^3$/g—VESTODUR ® 3000).

B 2: Homo-polybutylene terephthalate (J value: 110 cm$^3$/g—VESTODUR ® 1000).

B 3: Homo-polyethylene terephthalate (POLYCLEAR ® TR 86).

B 4: Blend of
 a. 90% by weight of homo-polybutylene terephthalate (J value: 110 cm$^3$/g—VESTODUR ® 1000) and
 b. 10% by weight of maleic acid-modified EPM (content of maleic anhydride: 0.7% by weight—based on component b; anhydride group content: 7 mmol/kg—based on component B)

B 5: Blend of
 a. 70% by weight of homo-polybutylene terephthalate (J value: 165 cm$^3$/g—VESTODUR ® 3000) and
 b. 30% by weight of MAKROLON ® 2800 (bisphenol A polycarbonate)

B 6: Blend of
 a. 80% by weight of homo-polybutylene terephthalate (J value: 110 cm$^3$/g—VESTODUR ® 1000) and
 b. 20% by weight of maleic acid-modified EPM (content of maleic anhydride: 0.7% by weight—based on component b; anhydride group content: 14 mmol/kg—based on component B) B 7: Blend of
 a. 80% by weight of homo-polybutylene terephthalate (J value: 110 cm$^3$/g—VESTODUR ® 1000) and
 b. 20% by weight of maleic acid-modified poly-trans-octenylene (content of maleic anhydride: 3.5% by weight—based on component b; anhydride group content: 71 mmol/kg—based on component B)

C. Production of the Multilayer Composites

Components (A) and (B) are first processed individually to pressed sheets approximately 1 mm thick (pressing time: 10 minutes, pressing temperature: 10° C. above the melting or softening point). No mold release agents are used. The individual sheets are then pressed to a multilayer composite. The pressing temperature here depends on the material having the highest melting or softening point and is preferably at least 5° C. above the highest melting or softening material. The pressing time is 10 minutes.

TABLE 1

| Experiment | Layer A | Layer B | can be separated mechanically at the boundary - after storage | | |
|---|---|---|---|---|---|
| | | | at 23° C. | at 160° C. | in fuel* |
| A | A1 | B1 | yes | yes | yes |
| B | A2 | B1 | yes | yes | yes |
| C | A3 | B2 | yes | yes | yes |
| D | A4 | B3 | yes | yes | yes |
| E | A5 | B4 | yes | yes | yes |
| F | A3 | B5 | yes | yes | yes |
| G | A6 | B2 | yes | yes | yes |
| H | A6 | B1 | yes | yes | yes |
| I | A7 | B1 | yes | yes | yes |

TABLE 1-continued

| Experiment | Layer A | Layer B | can be separated mechanically at the boundary - after storage | | |
|---|---|---|---|---|---|
| | | | at 23° C. | at 160° C. | in fuel* |
| K | A8 | B3 | yes | yes | yes |

Storage at 23° C. for 5 days in standard fuel M 15 (42.5 parts by volume of isooctane, 42.5 parts by volume of toluene and 15 parts by volume of methanol).

TABLE 2

| Experiment | Layer A | Layer B | can be separated mechanically at the boundary - after storage | | |
|---|---|---|---|---|---|
| | | | at 23° C. | at 160° C. | in fuel* |
| 1 | A2 | B6 | no | no | no |
| 2 | A9 | B6 | no | no | no |
| 3 | A10 | B6 | no | no | no |
| 4 | A10 | B4 | no | no | no |
| 5 | A11 | B6 | no | no | no |
| 6 | A11 | B4 | no | no | no |
| 7 | A9 | B7 | no | no | no |

*Storage at 23° C. for 5 days in standard fuel M 15 (42.5 parts by volume of isooctane, 42.5 parts by volume of toluene and 15 parts by volume of methanol).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A thermoplastic multilayer composite comprising:
 at least one layer A of a polyamide-based molding composition wherein at least 50% of all the end groups present in the polyamide are amino end groups and said end groups are present in layer A at a concentration of from 30 to 130 mmol/kg, and
 at least one layer B of a molding composition comprising a blend of:
 a) 95 to 60% by weight of a linear, crystalline polyester and
 b) 5 to 40% by weight of a polymer different than a) containing reactive groups other than epoxide groups reactive with the amino end group of the polyamide of layer A,
 wherein said reactive groups are present in a concentration of from 4 to 95 mmol/kg based on the total amount of layer B; and
 wherein said layers A and B are intimately and cohesively bonded to one another.

2. A thermoplastic multilayer composite according to claim 1, wherein at least 70% of all the end groups present in the polyamide are amino end groups.

3. A thermoplastic multilayer composite according to claim 1, wherein the concentration of amino end groups in layer A is in the range of from 60 to 110 mmol/kg.

4. A thermoplastic multilayer composite according to claim 1, wherein layer B is a molding composition comprising:
 a) 95 to 70% by weight of a linear, crystalline polyester and
 b) 5 to 30% by weight of a polymer containing said reactive groups.

5. A thermoplastic multilayer composite according to claim 1, wherein layer B is a molding composition comprising:

a) 90 to 80% by weight of a linear, crystalline polyester and b) 10 to 20% by weight of a polymer different than a) containing said reactive groups.

6. A thermoplastic multilayer composite according to claim 1, wherein the reactive groups present in b) of layer B are one or more reactive groups selected from the group consisting of carboxyl, anhydride, ester, N-acyl-lactam and oxazoline groups.

7. A thermoplastic multilayer composite according to claim 1, wherein said reactive groups are present in a concentration of from 6 to 75 mmol/kg based on the total amount of layer B.

8. A thermoplastic multilayer composite according to claim 1, wherein b) of layer B is a rubber polymer.

9. A molding prepared from a thermoplastic multilayer composite as claimed in claim 1.

10. A molding as claimed in claim 9, further comprising an additional one or more of said thermoplastic multilayer composites.

11. A hollow profile prepared from a molding as claimed in claim 9.

12. A thermoplastic multilayer composite as claimed in claim 1, wherein said polyamide is selected from the group consisting of 4,6-; 6-; 6,6-; 6,12-;' 8,10-;' 10,10-; 12,12-; 12,12-; 11-; and 12-homopolyamide; copolyamides of these homopolyamides with one or more additional acid components selected from the group consisting of adipic acid, sebacic acid, suberic acid, isophthalic acid, and terephthalic acid; copolyamides of these homopolyamides with one or more additional diamines selected from the group consisting of bis(4'-aminocyclohexyl)-methane, trimethyl hexamethylene diamine, and hexamethylene diamine; and mixtures thereof.

13. A thermoplastic multilayer composite according to claim 1, wherein said linear crystalline polyester comprises a polymer of formula (I)

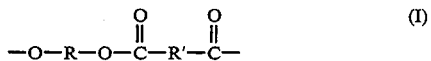

wherein R represents a divalent branched or non-branched, aliphatic or cycloaliphatic radical, derived from a diol having 2 to 12 carbon atoms in the chain, or a mixture thereof, and R' represents a divalent aromatic radical having 6 to 20 carbon atoms in the carbon skeleton.

14. A thermoplastic multilayer composite as claimed in claim 13, wherein up to 25 mol % of said radical R of said polyester is replaced by a second radical selected from the group consisting of a different radical than that as defined by R, and a radical derived by a diol of formula (II)

wherein R" represents a divalent radical having from 2 to 4 carbon atoms and x is an integer of from 2 to 50.

15. A thermoplastic multilayer composite as claimed in claim 13, wherein up to 20 mol % of said aromatic divalent radical R' is replaced by one or more aliphatic divalent radicals derived from a carboxylic acid selected from the group consisting of succinic acid, maleic acid, fumaric acid, sebacic acid and dodecanedioic acid.

16. A thermoplastic multilayer composite as claimed in claim 1, wherein said linear crystalline polyester has a viscosity number (J value) of from 80 to 240 cm³/g.

17. A thermoplastic multilayer composite as claimed in claim 1, wherein said polyamide based molding composition further comprises one or more substances selected from the group consisting of impact modifiers, processing auxiliaries, flameproofing agents, stabilizers, viscosity modifiers, fillers, and pigments.

18. A thermoplastic multilayer composite as claimed in claim 1, wherein layer B further comprises one or more substances selected from the group consisting of impact modifiers, processing auxiliaries, flameproofing agents, stabilizers, viscosity modifiers, fillers and pigments.

* * * * *